United States Patent [19]

Casperson

[11] 4,360,497
[45] Nov. 23, 1982

[54] FEEDSTOCK NOZZLE AND USE IN CARBON BLACK REACTOR

[75] Inventor: John R. Casperson, Bartlesville, Okla.

[73] Assignee: Phillips Petroleum Company, Bartlesville, Okla.

[21] Appl. No.: 257,040

[22] Filed: Apr. 24, 1981

[51] Int. Cl.³ .......................... C09C 1/48; B01J 10/00
[52] U.S. Cl. ...................................... 422/156; 239/69; 239/70; 239/132.1; 239/424; 239/444; 239/413; 422/150
[58] Field of Search ............... 422/150, 151, 156, 157, 422/158; 239/132.1, 132.3, 132.5, 139, 413, 414, 415, 416.1–416.4, 424, 69, 70

[56] References Cited

U.S. PATENT DOCUMENTS

| | | | |
|---|---|---|---|
| 2,207,758 | 7/1940 | Rehse | 239/424 |
| 3,071,443 | 1/1963 | Bellew | 422/151 |
| 3,615,242 | 10/1971 | Anderson et al. | 422/156 |
| 3,663,153 | 5/1972 | Bagge | 239/416.4 |
| 4,014,654 | 3/1977 | Howell | 423/450 |
| 4,206,176 | 6/1980 | Vanderveen | 422/158 |
| 4,221,339 | 9/1980 | Yoshikawa | 239/424 |
| 4,294,814 | 10/1981 | Cheng | 422/150 |

FOREIGN PATENT DOCUMENTS

| | | | |
|---|---|---|---|
| 2204175 | 7/1973 | Fed. Rep. of Germany | 239/424 |
| 259242 | 1/1949 | Switzerland | 239/424 |
| 559730 | 5/1977 | U.S.S.R. | 239/424 |

Primary Examiner—Michael S. Marcus

[57] ABSTRACT

A carbon black feedstock nozzle in which a central pipe with a diverging nozzle outlet is surrounded by at least one concentric annulus having a diverging nozzle outlet with a spray angle different from that of the central pipe and with means for supplying a separate controlled flow of inlet material to the central pipe and concentric annulus. In the preferred embodiment multiple concentric annuli surround the central pipe with the outermost annulus supplied with a coolant fluid as inlet material, and the other annuli supplied with hydrocarbon suitable as carbon black reactor feedstock. In a preferred embodiment means are provided for a seriatim cycling of flow through the various hydrocarbon feedstock annuli. A carbon black reactor in which a feedstock nozzle as described above discharges in a portion of the reactor that is either a precombustion section or a combustion section. A method for producing carbon black in which hydrocarbon feedstock is introduced into either a precombustion section or a combustion section of the carbon black reactor through a reactor feedstock nozzle as described above.

5 Claims, 5 Drawing Figures

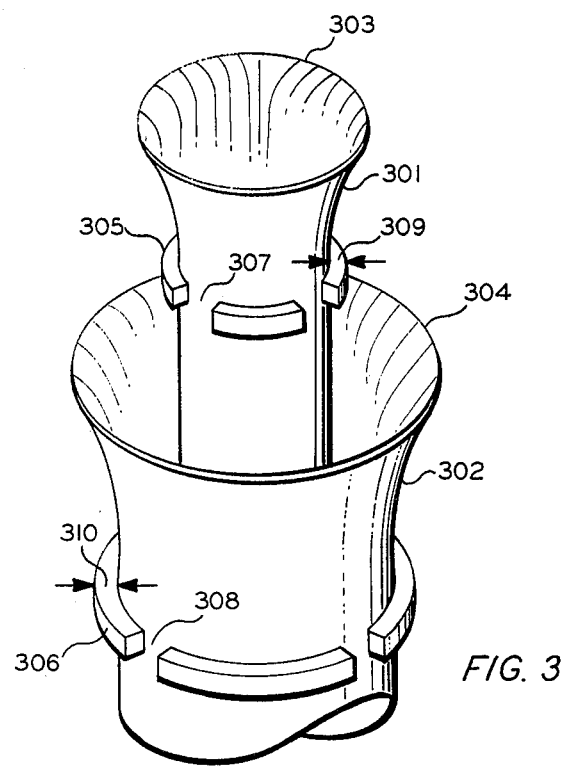
FIG. 3
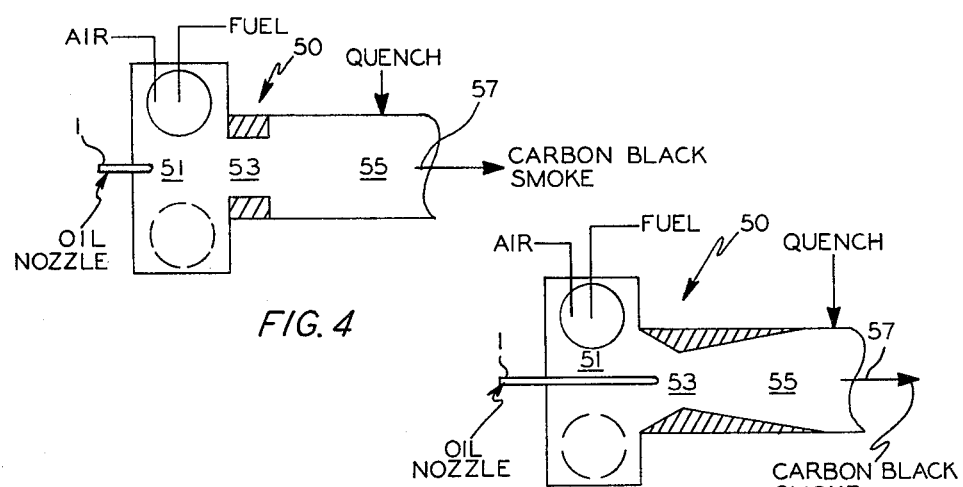
FIG. 4
FIG. 5

FEEDSTOCK NOZZLE AND USE IN CARBON BLACK REACTOR

BACKGROUND OF THE INVENTION

This invention relates to carbon black manufacture. In one of its aspects this invention relates to carbon black reactors. In another of its aspects this invention relates to the supplying of feedstock to carbon black reactors. In still another aspect of the invention it relates to the production of carbon black having negative tint residual.

It has been disclosed in U.S. Pat. No. 4,071,496 that the incorporation of a carbon black with a low tint residual, preferably below minus 6, in a rubber composition causes the hysteresis or heat buildup of such a rubber composition to be significantly lower than that of a rubber composition incorporating a carbon black with a higher tint residual, while the abrasion resistance of such rubber compositions incorporating these different carbon blacks remains essentially unchanged. Great importance has, therefore, been placed upon the discovery of methods and apparatuses that are capable of producing a carbon black having low tint residual.

Tint residual is the difference between the measured tint and the tint calculated from the structure, nitrogen surface area and CTAB surface area of a carbon black sample in accordance with a specific formula.

$$TR = T - [56.0 + 1.057(CTAB) - 0.002745(CTAB)^2 - 0.2596(DBP) - 0.201(N_2SA - CTAB)]$$

In this formula the abbreviations used have the following meanings and the properties are measured as described:

TR: This is tint residual.

CTAB: This is the surface area of the carbon black measured in accordance with ASTM method D3765-80, $m^2/gm$.

$N_2SA$: This is the surface area of the carbon black measured using nitrogen in accordance with the ASTM method D-3037-76, $m^2/gm$.

Compressed DBP: This is the structure of the carbon black and is measured in accordance with ASTM 3493-76, cc/100 gm. This property is also referred to as 24M4 DBP.

T: This is the tint or tinting strength of the carbon black measured relative to the industry reference black IRB No. 3 which has an arbitrary value of 100. Tint is measured in accordance with ASTM 3265-80.

The surface area, as described above as CTAB and $N_2SA$ is usually an inverse measurement of the nodule size of the carbon black. The structure of the carbon black, expressed above as DBP, is a measure of the complexity of the individual carbon black aggregates or of the number of nodules "fused" together in one carbon black aggregate.

It is therefore an object of this invention to provide method and apparatus by which low tint residual carbon black can be manufactured. It is another object of this invention to provide a feedstock nozzle that is useful in a carbon black reactor for the production of carbon black having a low tint residual.

Other aspects, objects, and the various advantages of this invention will become apparent upon reading the specification and the claims and studying the appended drawing.

STATEMENT OF INVENTION

According to this invention, a carbon black reactor feedstock nozzle is provided having a central pipe with a plug and a diverging nozzle outlet and at least one concentric annulus surrounding the central pipe with the annulus having a diverging nozzle outlet with a spray angle different from that of the central pipe and having means for separate control of supply of inlet material.

In preferred embodiments of the invention multiple concentric annuli surround the central pipe with each annulus having a diverging nozzle with a spray angle different from the other annuli and with each annulus also having means for supplying a separate controlled supply of inlet material.

In the most preferred embodiment of this invention the outermost concentric annulus is supplied with a coolant fluid, such as air, as the inlet material while all the other annuli and the central pipe are supplied with hydrocarbon inlet material and with provision for a controlled, seriatim cycling of inlet flow to the various hydrocarbon carrying annuli.

In other embodiments of the invention there are provided a carbon black reactor in which a feedstock nozzle, as described above, is mounted to discharge into either a precombustion zone or a combustion zone of the reactor. There is also provided a method for producing carbon black in which hydrocarbon feedstock is introduced either into a precombustion section or a combustion section of a carbon black reactor using the feedstock nozzle described above.

The invention can be best understood in conjunction with the drawing in which

FIG. 3 is a view of nozzle conduit means with spacing and flow regulating means;

FIG. 4 is a diagrammatic representation of a carbon black reactor with a feedstock nozzle position in the upstream end of the reactor; and FIG. 5 is a diagrammatic representation of a carbon black reactor with a feedstock nozzle positioned at the Venturi inlet of the reactor.

Figure 1:
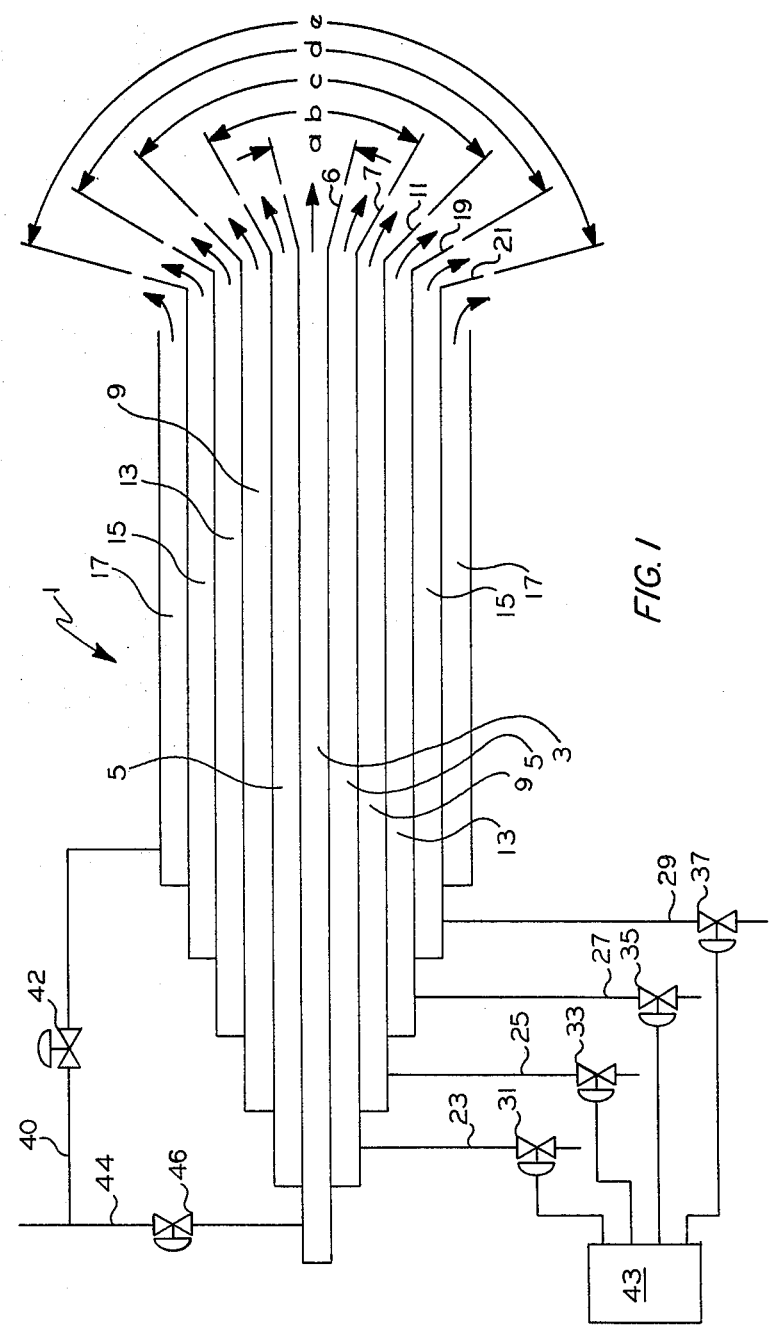
FIG. 1 is a cutaway, diagrammatic sideview of a reactor feedstock nozzle.

Referring to FIG. 1, a reactor feedstock nozzle 1 is illustrated having a central pipe 3 and a diverging nozzle outlet 6. The central pipe 3 is surrounded by a first annulus 5 which also has a diverging nozzle 7. Similarly, there are additional annuli 9, 13, 15, and 17 each of which, with the exception of the outer annulus 17, has a diverging nozzle 11, 19, and 21, respectively, at the annulus exit.

The diverging nozzles of the various annuli and the central pipe are so arranged that the angle of flow of the inlet material from each of the different openings is at a different angle from each of the other openings, so that the angle of flow of material illustrated here as a, b, c, d, and e is each different from the others.

There is no diverging nozzle on the outermost concentric annulus 17 since the purpose of flow through this nozzle is to admit coolant fluid from the nozzle in axial flow to impinge nozzle 21 to cool the nozzle, and to act as a buffer zone between the tangentially admitted reactor flow and the reactor hydrocarbonaceous feedstock flow from at least two of the inner annuli 5, 9, 13, and 15 which are directed at an angle to the axially flowing cooling fluid.

Concentric annulus 5, 9, 13 or 15 each has its respective inlet means 23, 25, 27, or 29 for introduction of feedstock. Each of the inlet means 23, 25, 27, and 29 has a flow control means 31, 33, 35, and 37, respectively, for controlling the inlet material flow into the nozzle 1 and these control means are subject to a select control means 43 which causes an interaction of control of flow of the hydrocarbonaceous feedstock into the nozzle 1. Usually the oscillation of flow will be sequenced for inlet to each nozzle for a time within the range of about 1 to about 20 seconds, preferably about 2 to about 10 seconds.

Annulus 17 and central pipe 3 both add cooling fluid into the reactor to keep the nozzle 1 at a sufficiently low temperature to prevent damage to the nozzle. Cooling fluid, such as air, is introduced into annulus 17 by way of conduit 40 containing flow control means 42. Cooling fluid is introduced into central pipe 3 by way of conduit 44 containing control means 46.

Figure 2:
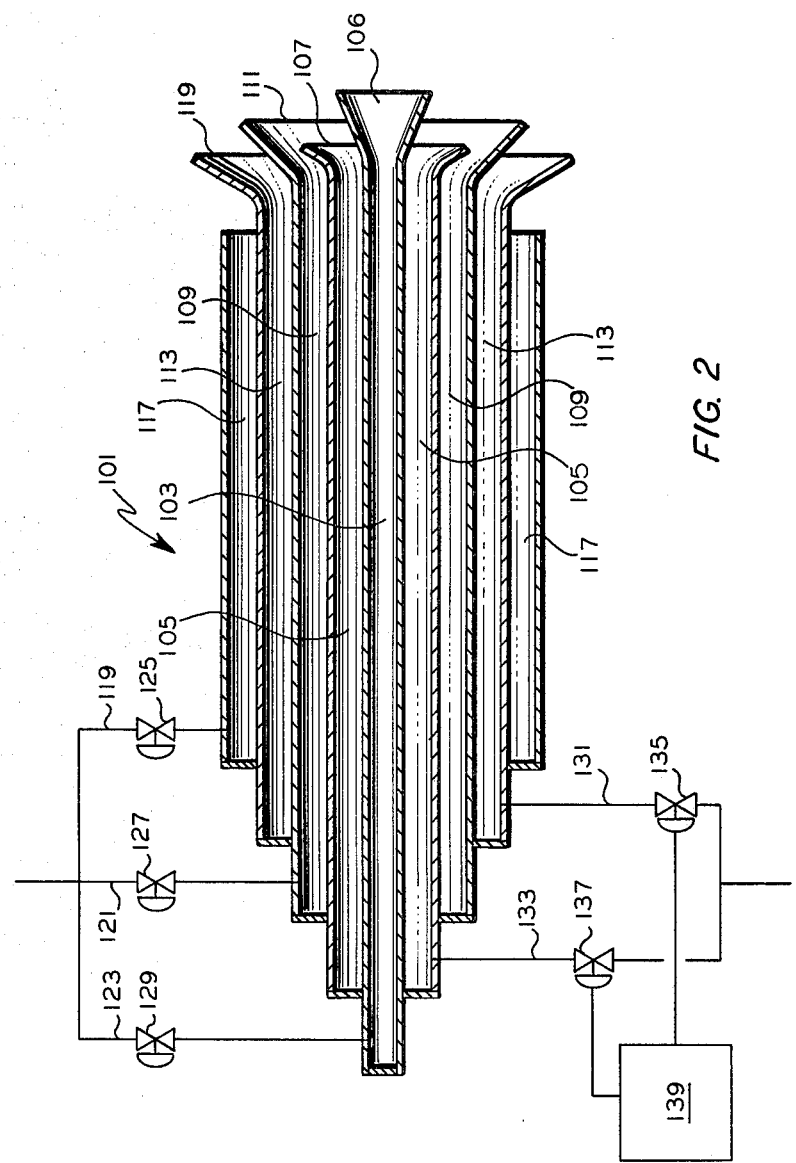
FIG. 2 is a cross-sectional view of a feedstock nozzle.

Referring now to FIG. 2, a reactor feedstock nozzle is illustrated having a central pipe 103 and a diverging nozzle outlet 106. The central pipe 103 is surrounded by a first annulus 105 which has diverging nozzle 107. Similarly, there are additional annuli 109, 113, and 117, each of which, with the exception of outer annulus 117, has a diverging nozzle 111, 119, at the annulus exit.

In this embodiment, central pipe 103 and annuli 109, 117 carry the flow of cooling fluid, such as air. Annuli 105 and 113 carry the feedstock. The cooling fluid exiting annulus 117 impinges the feedstock nozzle 119 on its adjacent outer surface. The cooling fluid exiting annulus 109 through nozzle 111 impinges the feedstock nozzle 119 on its adjacent outer surface, and also impinges the feedstock nozzle 107 on its adjacent outer surface. Central pipe 3 flows cooling fluid from its diverging nozzle 106 within feedstock exiting nozzle 107.

The cooling fluid is added to annuli 117, 109 and to central pipe 103 by way of conduits 119, 121, and 123. Conduits 119, 121, and 123 contain flow control means, respectively, at 125, 127, and 129.

Conduits 131 and 133 change feedstock to concentric annuli 113 and 105, respectively. Conduits 131 and 133 contain flow control means 135 and 137 for controlling the rate of flow of feedstock. Control means 135 and 137 are subject to select control means 139 which causes an interaction of control of flow of the hydrocarbonaceous feedstock into nozzle means 101.

Nozzles 106 and 111, for cooling fluid flow, discharge the fluid at lesser and greater diverging angles, respectively. Nozzles 107 and 119 discharge the hydrocarbonaceous feedstock at lesser and greater diverging angles, respectively.

Referring to FIG. 3, there are shown two adjacent tubes, conduits or pipes which together form an annulus of nozzle 1. The inner conduit 301 and the outer conduit 302, is each flared, 303, 304. These flared portions form a nozzle outlet for the annulus. Spacers 305, 306 are affixed to the outer surfaces of the conduits 301, 302. Spacers 305, 306 have cutaway portions 307, 308, sized along with the thicknesses 309, 310 so that a predetermined rate of flow of effluent, e.g., feedstock, is effected.

Referring now to FIG. 4 and FIG. 5, in which like numbers represent like elements, a carbon black reactor 50 is divided into a precombustion section 51; a first reaction, mixing section 53; a second reaction section 55; and a product removal section 57. A feedstock nozzle 1 is illustrated in FIG. 4 as discharging into a precombustion section 51 and in FIG. 5 as discharging into a first section 53. In normal operation, combustion gases can be introduced tangentially into precombustion section 51 thereby forming a rotating mass of hot gases which converge to pass through mixing, reaction section 53 as shown in FIG. 4 or FIG. 5. In reaction zone 55 the partial combustion of hydrocarbon inlet material emitted from the feedstock nozzle 1 is completed, carbon black formation has occured, and the carbon black reaction product is removed from the reactor through the product line 57.

The present invention, as illustrated in FIG. 1 and FIG. 4, for example, provides means by which hydrocarbon inlet material can be fed into any one or all of the annuli 5, 9, 13, and 15. In a preferred operation, the hydrocarbonaceous feed is fed to only one of these annuli at a time, so that with a constant supply of coolant, e.g., air passing through conduit 40 and control valve 42 into the outer concentric annulus 17, the feedstock hydrocarbonaceous material is alternatively discharged through the feedstock nozzles at different angles of flow into the carbon black reactor and adjacent the annular cooling fluid entering the reactor. This is illustrated with controller 43 set to allow a predetermined rate of flow of feedstock through only valve 31, inlet line 23, for a predetermined period of time through annulus 5. Inlet valve 31 is then closed and inlet valve 33 is opened to allow the same rate of flow through conduit 25 to concentric annulus 9. After the flow has continued for the same amount of time, valve 33 is closed and inlet valve 35 is opened to allow the same rate of flow of feedstock through conduit 27 and annulus 13. After the flow has continued for the same amount of time, valve 35 is closed, valve 37 is opened and the flow through conduit 29 and annulus 15 is effected. After the flow has continued for the same amount of time, valve 37 is closed and again valve 31 is opened and the cycle is continued.

By changing the flow of inlet hydrocarbon to pass through diverging nozzle outlets having different angles of divergents, the quality of carbon black produced is affected so that carbon black of low tint (or negative) residual can be produced.

U.S. Pat. No. 3,009,784 demonstrates the change in nodule size or particle size ($N_2SA$ in $m^2/gm$) with oil nozzle angle change. With all other reaction conditions held constant, an increase in angle of injection produces a change in particle size.

U.S. Pat. No. 3,079,236 demonstrates the change in structure (oil absorption) with oil nozzle angle change. With all other reactions conditions held constant, an increase in angle of injection produces a change in oil absorption.

| Calculated Example for N330 Carbon Black (FIGS. 1 and 4) | |
|---|---|
| Flow Rates: | |
| Tangential Air (Total), SCF/hr., | 220,000 |
| Temperature, °F., | 800 |
| Tangential Fuel ($CH_4$), SCF/hr., | 13,000 |
| Temperature, °F., | 100 |
| Oil[a] to Nozzle (1); gallons/hr. (gph), | 400 |
| Separately charged[b] at: b = 30 degrees, c = 60 degrees, d = 90 degrees, and e = 120 degrees. | |
| Temperature, °F., | 450 |
| Quench Water, gallons/hr., | 100 |

-continued

| Calculated Example for N330 Carbon Black (FIGS. 1 and 4) | |
| --- | --- |
| Temperature, °F., | 100 |
| Annular Air (17), SCF/hr., | 4,000 |
| Reactor Dimensions: | |
| Precombustion Zone (51): | |
| Diameter, inches, | 24 |
| Length, inches, | 12 |
| Reaction Zone (50): | |
| Diameter (50), inches, | 12 |
| Length[c], inches, | 50 |
| Choke (Cylinder): | |
| Length, inches, | 12 |
| Inside Diameter, inches, | 10 |

[a]110 BMCI; 600° F. mid-boiling point.
[b]Oil is added cyclically via each flow path 5, 9, 13, 15 and nozzles b, c, d, and e, respectively, at the rate of 400 gph at a velocity of about 50 feet per second, via each nozzle separately for a period of about 2 minutes.
[c]Measured from downstream face of precombustion zone (PCZ) to quench injection.

| | Specific Nozzle (FIG. 1) | |
| --- | --- | --- |
| (3) | Central Air Conduit, cross-sectional area, in.$^2$, | 0.05 |
| | (a) Total Angle of Divergence, degrees, | 15 |
| (5) | Oil Annulus, Annular cross-sectional area, in.$^2$, | 0.05 |
| | (b) Total Angle of Divergence, degrees, | 30 |
| (9) | Oil Annulus, Annulus cross-sectional area, in.$^2$, | 0.05 |
| | (c) Total Angle of Divergence, degrees, | 60 |
| (13) | Oil Annulus, Annulus cross-sectional area, in.$^2$, | 0.05 |
| | (d) Total Angle of Divergence, degrees, | 90 |
| (15) | Oil Annulus, Annulus cross-sectional area, in.$^2$, | 0.05 |
| | (e) Total Angle of Divergence, degrees, | 120 |
| (17) | Oil Annulus, Annulus cross-sectional area, in.$^2$, (for 4,000 SCF/hr flow) | 3.2 |

This nozzle is designed for 400 gph of oil flow through each annulus, and can be further water cooled (not shown).

Stainless steel is the preferred material of construction for the nozzle.

Further, according to this invention, a structure reducing compound, e.g., a potassium compound, can be added to the system, e.g., into the feedstock using the wide angle nozzle, to obtain narrow structure and broad nodule ranges; and/or higher BMCI (Bureau of Mines Correlation Index) feedstock can be used in the wide angle nozzle to further broaden the structure (aggregate) range.

A low BMCI feedstock can be used in the narrow angle nozzle to further broaden the structure range while using high BMCI oil in the wide angle nozzle.

Various conbinations of structure reducing additives, high and low BMCI oils, and the like can be used to obtain desired ranges of structures of the carbon black produced by invention.

Any sequence of oil injection can be used in annuli 5, 9, 13, and 15 (FIG. 1). The time of individual injections does not have to be the same. Preferably, the time of oil flow via each annulus is between about 30 seconds and about 10 minutes, and more preferably about one to about 5 minutes.

Additional information relating tint residual to aggregate size distribution and nodule size distribution is detailed in *Rubber Chemistry and Technology*, Volume 48, No. 4, September-October, 1975, pages 538 through 547. This publication is incorporated herein by reference.

The present invention takes advantage of the effects of oil injection angles on both nodule or particle size ($N_2SA$ or CTAB), and of structure or aggregate values (DBP) to produce a broad spectrum or range of sizes of nodules and aggregates for the production of low or negative tint residual carbon black product.

I claim:

1. A carbon black reactor feedstock nozzle comprising:
   (a) a central pipe with a diverging nozzle outlet,
   (b) multiple concentric annuli surrounding said central pipe each annulus having a diverging nozzle outlet with a spray angle different from the other annuli and means for supplying a separate, controlled supply of inlet material to each annulus and
   (c) means for a seriatim cycling of feedstock flow to at least two of said multiple concentric annuli.

2. A carbon black reactor feedstock nozzle of claim 1 wherein the central pipe and outermost concentric annulus are supplied with a coolant fluid as inlet material and all other concentric annuli are arranged to be supplied with hydrocarbon inlet material.

3. A carbon black reactor feedstock nozzle of claim 2 wherein said coolant fluid is air.

4. A carbon black reactor comprising a precombustion zone and a combustion zone with a feedstock nozzle of claim 1 or 3 arranged for introduction of flow into the precombustion zone.

5. A carbon black reactor comprising a feedstock nozzle of claim 1 or 2 arranged for introduction of flow into a combustion zone.

* * * * *